United States Patent [19]

Matsumoto et al.

[11] Patent Number: 5,185,788
[45] Date of Patent: Feb. 9, 1993

[54] DIAL NUMBER GENERATOR

[75] Inventors: Masafumi Matsumoto, Nara; Toshihiro Matsuda, Yamatokoriyama, both of Japan

[73] Assignee: Sharp Kabushiki Kaisha, Osaka, Japan

[21] Appl. No.: 567,061

[22] Filed: Aug. 14, 1990

[30] Foreign Application Priority Data

Aug. 17, 1989 [JP] Japan .................................. 1-96496

[51] Int. Cl.⁵ .................................. H04M 1/274
[52] U.S. Cl. .................................. 379/357; 379/354; 379/355
[58] Field of Search .................. 379/354, 355, 356, 357, 379/216

[56] References Cited

U.S. PATENT DOCUMENTS

| 2,988,603 | 6/1961 | Kumagai | 379/354 |
| 4,595,798 | 6/1986 | Brodbeck | 379/357 |
| 4,782,521 | 11/1988 | Bartlett et al. | 379/355 |
| 4,914,691 | 4/1990 | Berger | 379/357 |

FOREIGN PATENT DOCUMENTS

| 324316 | 7/1989 | European Pat. Off. . |
| 3110863 | 9/1982 | Fed. Rep. of Germany . |
| 60-249455 | 11/1985 | Japan . |
| 62-6381 | 2/1987 | Japan . |
| 62-65121 | 3/1987 | Japan . |

Primary Examiner—James L. Dwyer
Assistant Examiner—M. Shehata.
Attorney, Agent, or Firm—Nixon & Vanderhye

[57] ABSTRACT

A dial number generator includes a plurality of cards (C1, C2, C3) having a display section on which a large number of subscribers are symbolically displayed and a identification section for (10, 10a) for identifying the type of the card. The generator further includes a main body (1), in which the plurality of cards are housed in a cavity (9) which generates a dial signal in facsimile transmision, etc. The main body has a transparent touch panel (5) by which the symbolic display of one card which is housed can be selectively pressed from the outside of the main body, a detection device (200) capable of identifying the type of the one card, and a device (221) for generating a dial number of subscriber to be called corresponding to a signal output from both the transparent touch panel and the detection device.

8 Claims, 10 Drawing Sheets

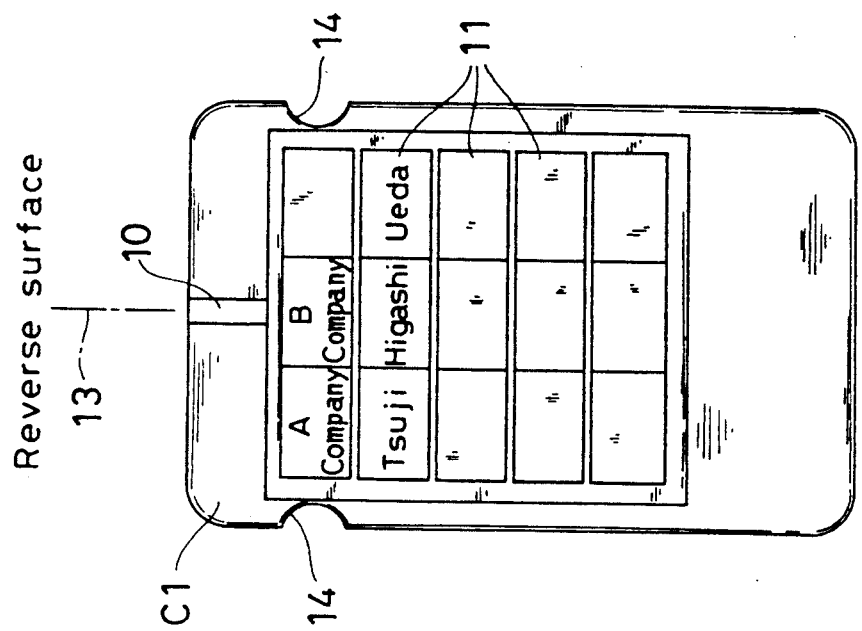
FIG. 5 (1)
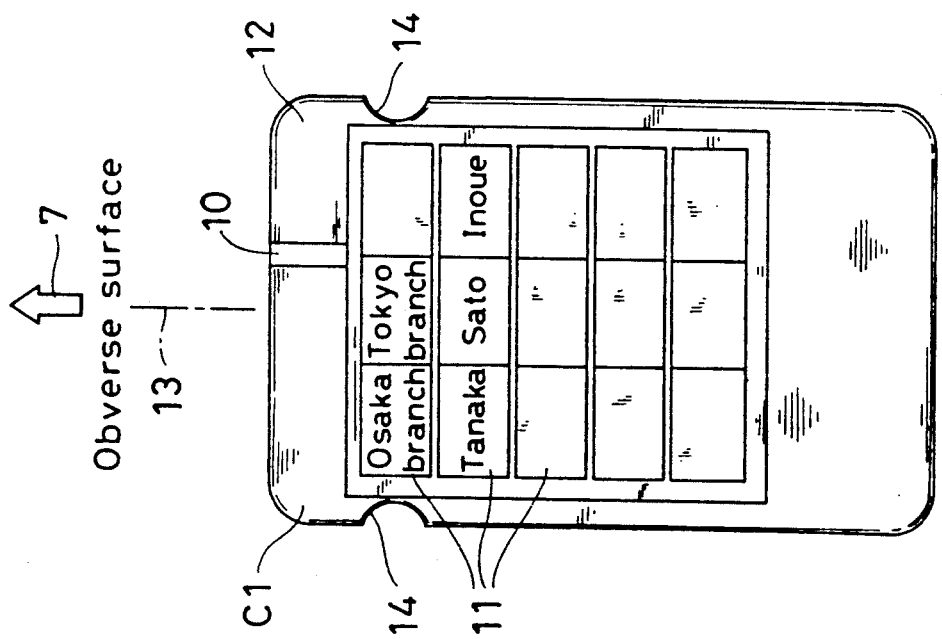
FIG. 5 (2)

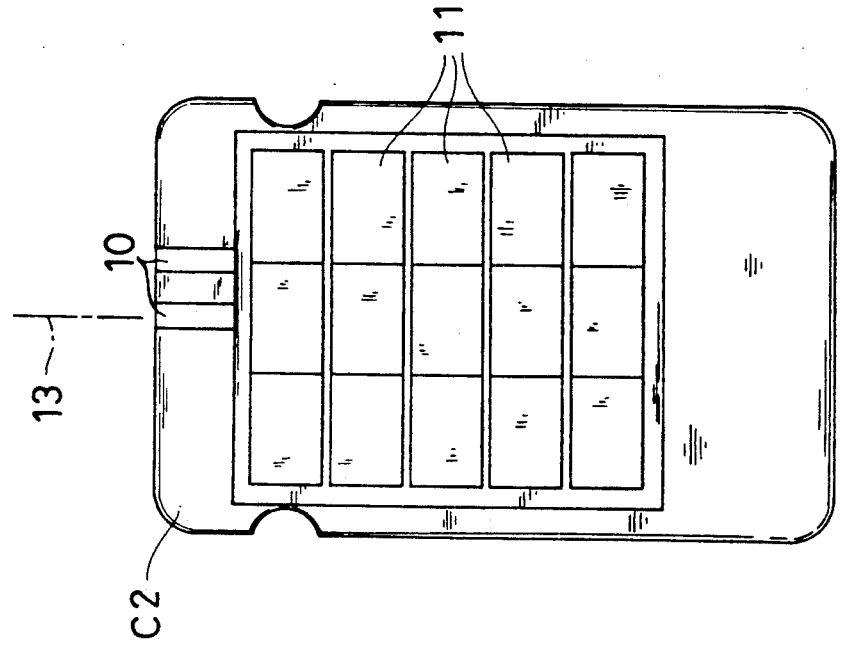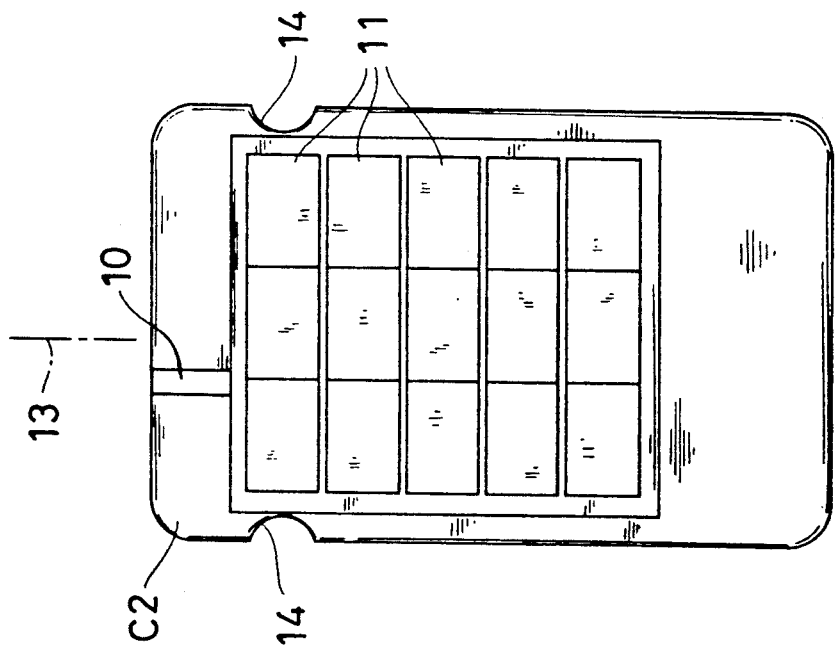

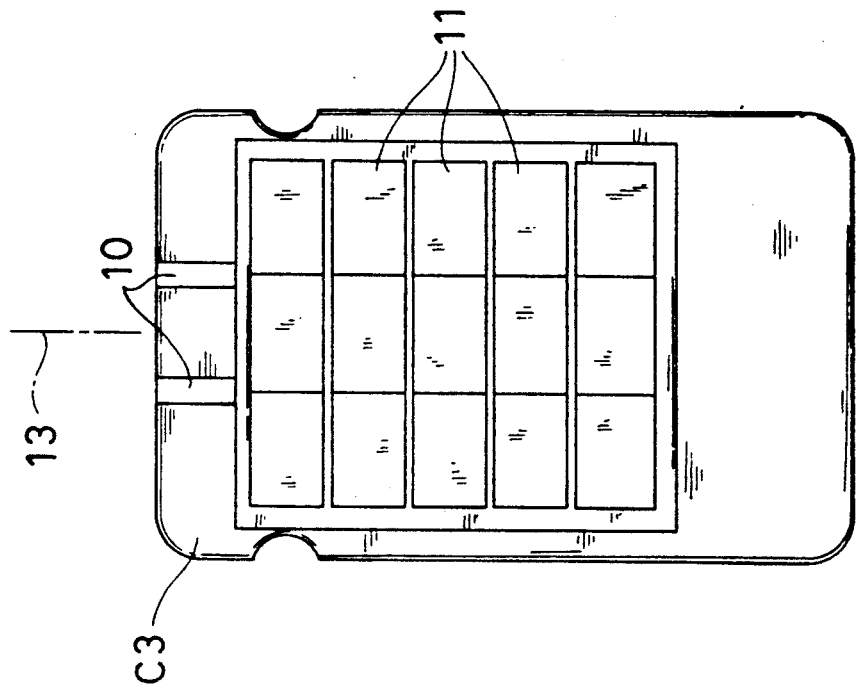
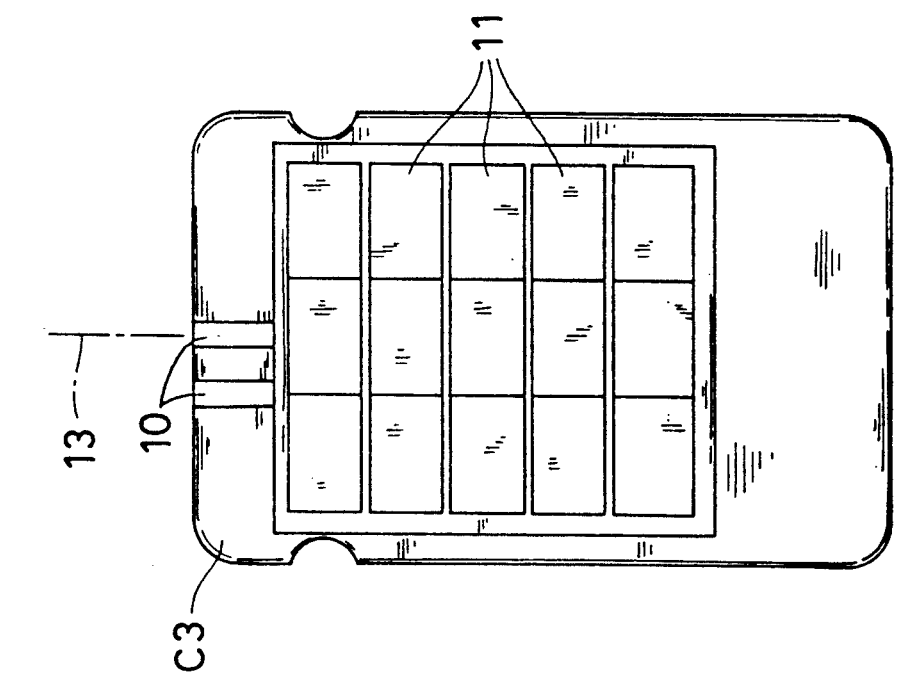

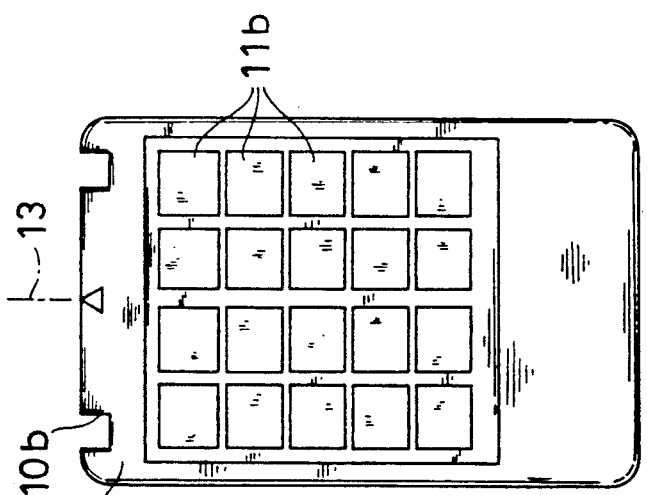
FIG. 12 (3)
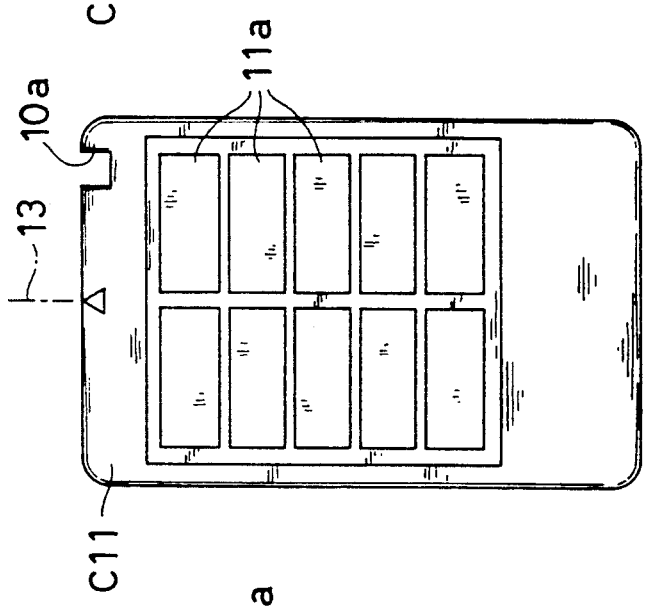
FIG. 12 (2)
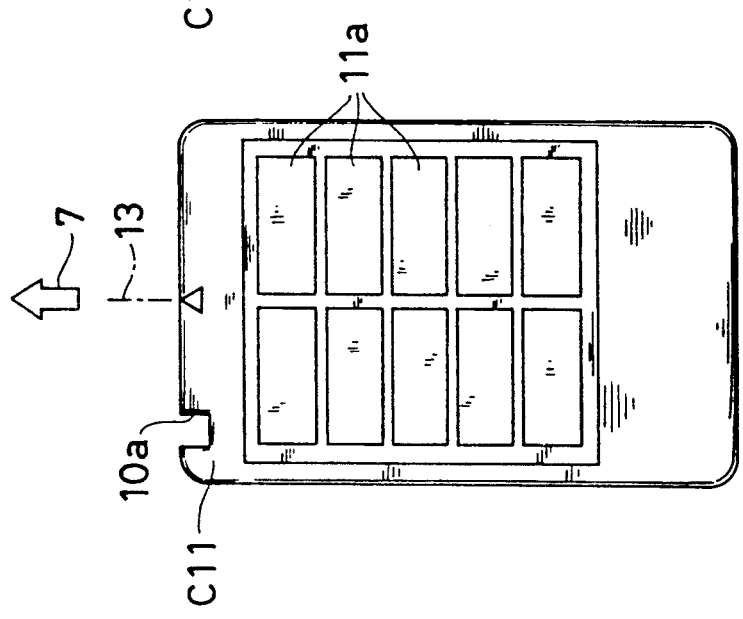
FIG. 12 (1)

DIAL NUMBER GENERATOR

BACKGROUND OF THE INVENTION

1. Field of the Invention

The present invention relates to a device for generating a signal representing a dial number in a facsimile apparatus, a telephone set or the like.

2. Description of the Prior Art

In a conventional typical facsimile apparatus, a number of pushbuttons individually corresponding to subscribers to be called are disposed on an operation panel. The pressing of one pushbutton on the operation panel causes a signal representing a dial number to be generated, thereby allowing facsimile communication.

In such prior art, where there are a large number of subscribers to be called, the number of pushbuttons individually corresponding to the subscribers to be called is necessarily increased, and therefore the area of the operation panel occupied by the pushbuttons is increased, resulting in increased costs.

In "Telephone Automatic Dial Signal Generator" of Japanese Patent Laid-Open No. 6381/1987 is disclosed an arrangement in which an electronic address card having a storage section is adapted to be releasably loaded to the telephone automatic dial signal generator, a plurality of telephone numbers can be stored in the electronic address card, and when originated automatic dial signal origination is made possible by reading out a telephone number from the electronic address card.

Also, in "Input Device" of Japanese Patent Laid-Open No. 65121/1987 is disclosed an arrangement in which a switch is made of a transparent raw material, items to be input from the switch are displayed on the item display board disposed directly below the switch, and the destination information (telephone number) of any item can be set by pressing the switch.

SUMMARY OF THE INVENTION

In view of the above-described disadvantages of the prior art, it is a primary object of the present invention to provide a dial number generator which does not require a large occupied area for an operation panel and which is capable of generating a dial number for a great number of subscribers to be called.

To this end, according to the present invention, there is provided a dial number generator comprising: a plurality of plate-like cards for selecting a specific subscriber to be called; and a main body in which said cards are housed, for generating a dial signal of a specific subscriber to be called;

said cards each having, on one side thereof, a subscriber display section in which a number of subscribers are symbolically displayed and a card identifying section for identifying the card;

said main body including:

a housing section for housing said cards with their subscriber display sections facing upward;

a subscriber selecting section provided with a transparent window from which the subscriber display section of one of said cards housed in the housing section is viewed from above, which is further provided with switches on the window at positions corresponding to positions of respective subscribers displayed on the card, said subscriber selecting section outputting a subscriber call signal corresponding to each subscriber when the switch is operated via the window;

a detecting section provided in the housing section for detecting any one of the card identifying sections of the cards and outputting a card signal corresponding thereto;

a storage section for storing a subscriber dial number corresponding to a combination of a subscriber call signal and a card signal; and a dial number read-out section for reading out a subscriber dial number corresponding to a combination of a subscriber call signal and a card signal.

According to the present invention, a housing space is provided in which a card is housed in the housing of a facsimile apparatus, a telephone set or the like. A transparent electrode type touch panel (hereinafter referred to as a sheet switch) is disposed in the upper section of the housing space. This sheet switch includes switches at positions which correspond to the subscriber display sections of a card housed in the housing space. In the card is provided a card identifying section for identifying the card, and this identifying section is detected by a detecting section. Therefore, the card is housed in the housing space so that the subscriber display section faces upward and a switch at a position corresponding to a subscriber is operated. As a result, a signal representing a dial number corresponding to a subscriber is derived on the basis of the output of the sheet switch and a signal output from said detection section, thus allowing facsimile transmission, telephone communication or the like over a telephone line.

As set forth hereinabove, according to the present invention, a plurality of cards which are housed in the housing space are prepared, at least the topmost card among the cards is replaced selectively, and the sheet switch at a position corresponding to the subscriber display section of the topmost card is switched. As a result, since a signal representing a dial number can be generated, the generation of dial numbers of a great number of subscribers to be called is made possible in a relatively small occupied area of a sheet switch by replacing cards.

BRIEF DESCRIPTION OF THE DRAWINGS

An embodiment of the invention will now be described by way of example and with reference to the accompanying drawings in which:

FIG. 5 is a view illustrating a card C1;

FIG. 6 is a view illustrating a card C2;

FIG. 7 is a view illustrating a card C3;

FIG. 12 is a view illustrating cards C11 and C12 in another embodiment of the present invention.

DESCRIPTION OF THE PREFERRED EMBODIMENTS

Figure 1:
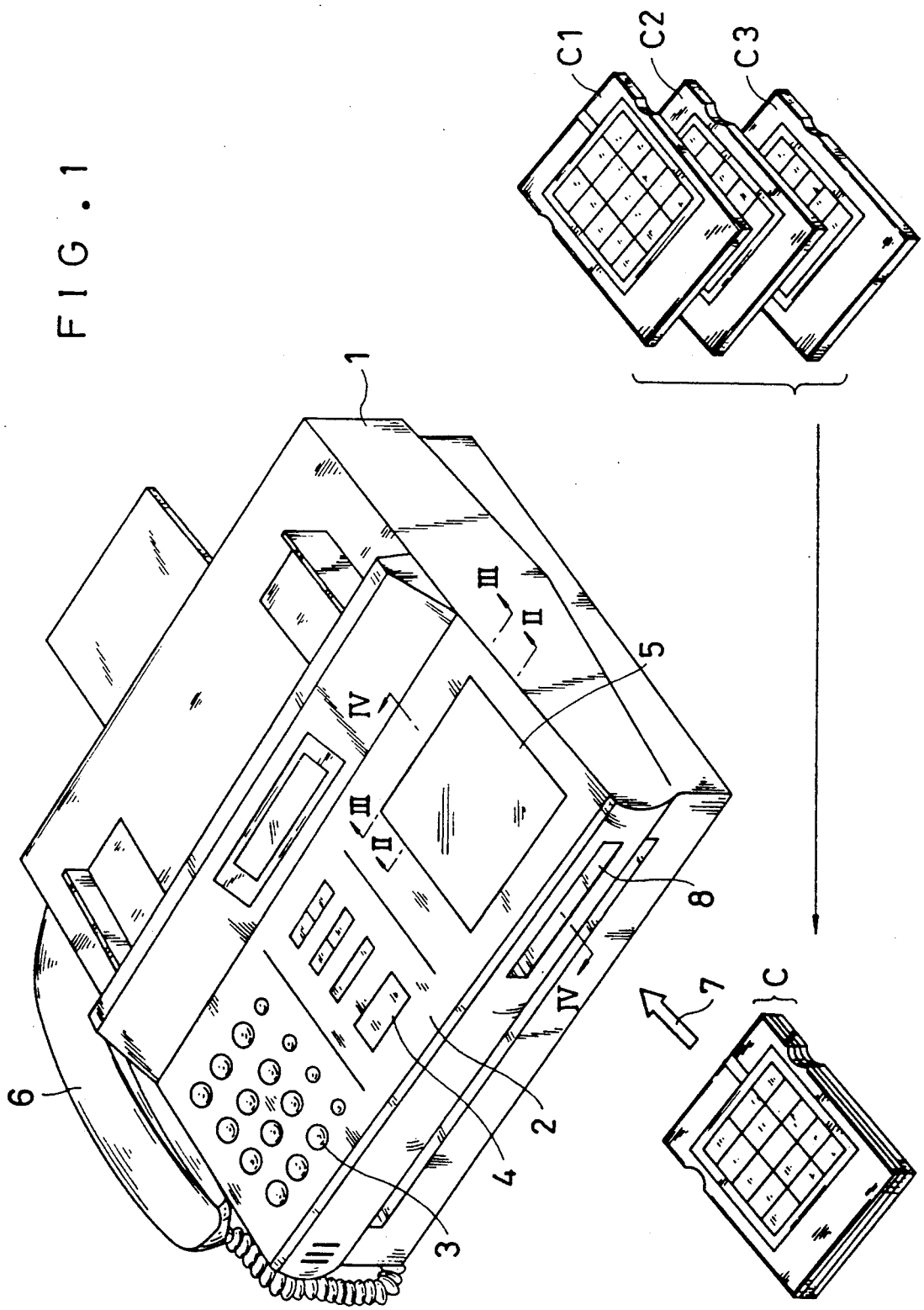
FIG. 1 is a perspective view of an embodiment of the present invention.

FIG. 1 is a perspective view illustrating an embodiment of the present invention. On an operation panel 2 in the upper section of a housing 1 of a facsimile apparatus are disposed a key input section 3 inputting numeral, a display section 4 for displaying facsimile communication status, a sheet switch 5 used in the present invention, and a handset 6 which is releasably disposed for telephone communication, thereby allowing facsimile transmission and reception to and from a subscriber to be called to which a manuscript is sent or received.

In order to generate a signal representing a dial number of a subscriber to be called at facsimile transmission, a plurality (3 in this embodiment) of cards C1, C2 and C3(sometimes denoted by reference character C collectively) are used in the present invention. These three cards C are inserted in an insertion slot 8 disposed in the front of the housing 1, as shown by an arrow 7.

Figure 2:
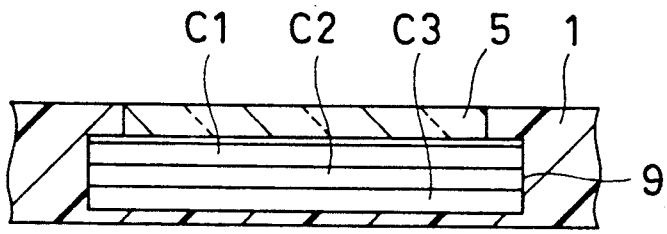
FIG. 2 is a cross sectional view taken along the line II—II of FIG. 1.

FIG. 2 is a cross sectional view taken along the line II—II of FIG. 1. A housing space 9 for housing three cards C is formed in the housing 1.

Figure 3:
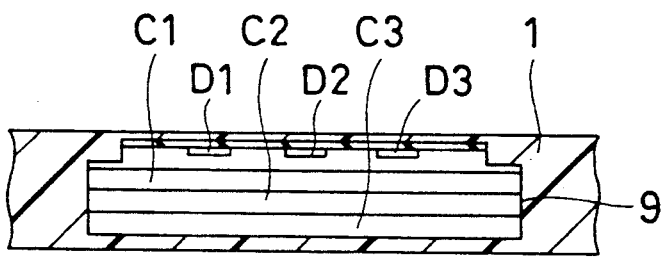
FIG. 3 is a cross sectional view taken along the line III—III of FIG. 1.

FIG. 3 is a cross sectional view taken along the line III—III of FIG. 1. Reflection type detection elements D1, D2 and D3 are disposed so as to optically detect the obverse surface of the topmost card (for instance, C1 in this embodiment) among the cards C. In the reflection type detection elements D1, D2 and D3, a light emitting device and a light receiving device are disposed in pairs and optically detect an identification section 10 to be described later which is formed on the obverse surface of the topmost card C1.

Figure 4:
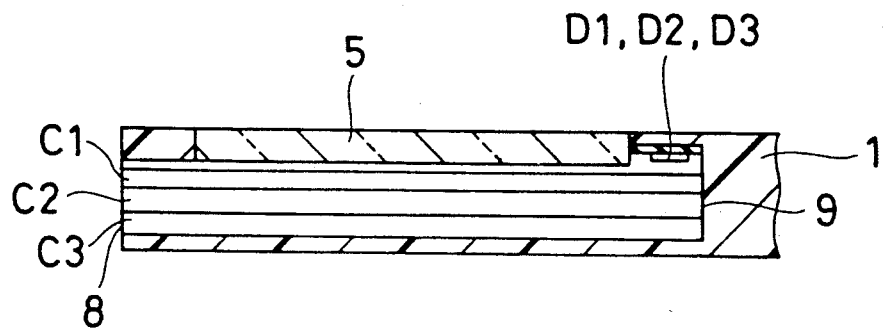
FIG. 4 is a cross sectional view take along the line VI—VI of FIG. 1.

FIG. 4 is a cross sectional view taken along the line VI—VI of FIG. 1. The detection elements D1, D2 and D3 are disposed at the front end portions in the housing space 9 in the insertion direction 7.

FIG. 5 is a view illustrating the surface of the card C1. On one surface of this card C1 is disposed a subscriber display section 11 on which a plurality of names, etc. (15 in this embodiment) for specifying a subscriber are written, as shown in FIG. 5(1). An identification section 10, for identifying the type of the one surface of the card C1, is formed on the end section 12 of the cards positioned in the insertion direction 7 and forward of the subscriber display section 11. This identification section 10 is formed by an arrangement of black long and narrow stripe-like section patterns on a white background.

On the other surface of the card C1 are formed the subscriber display section 11 and the identification section 10 for identifying the other surface of the card C1, as shown in FIG. 5(2).

In order to insure the front end of the card C1 in the insertion direction 7 is aligned, notches 14, which are symmetric with respect to the center line 13, are formed on the sides of the card C1.

FIG. 6(1) shows one surface of the card C2, and FIG. 6(2) shows the other surface of the card C2. This card likewise includes the subscriber display section 11 and the identification section 10 for identifying the surface of the card C2, and notches 14 are formed in the card C2.

As shown in FIG. 7(1), in the card C3 also, the subscriber display section 11 and the identification section 10 for identifying one surface of the card C3 are disposed on one of the surfaces of the card C3. As shown in FIG. 7(2), the subscriber display section 11 and the identification section 10 for identifying the other surface of the card C3 are also formed on the other surface of the card C3.

Figure 8:
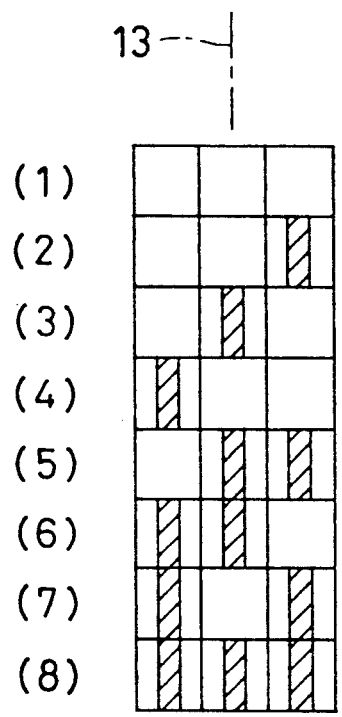
FIG. 8 is a identification table showing identification patterns.

FIG. 8 shows a identification table for identifying each surface of the cards. Stripe-like sections which are identification marks are formed symmetrically with respect to the center line 13 of the card C, as shown by shaded portions. In this embodiment, the stripe-like sections are selectively disposed in a total of three positions, thereby allowing the identification of each surface of $2^3$ ($=8$) types of cards. The identification section 10 may be formed so as to be arranged differently than above. Also, it may be so arranged that the subscriber display section 11 and the identification section 10 may be formed only on one surface of the card C.

Figure 9:
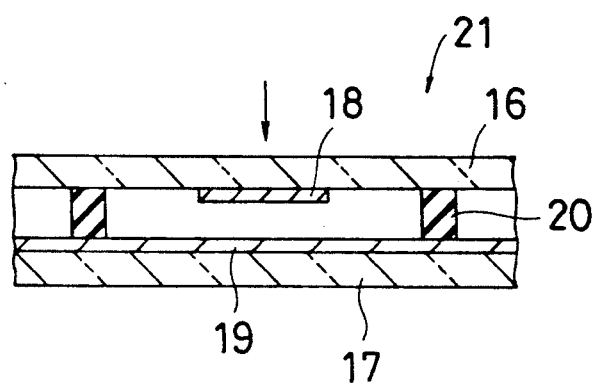
FIG. 9 is a cross sectional view illustrating the construction of a portion of a sheet switch 5.

FIG. 9 is a cross sectional view illustrating the sheet switch 5. In this sheet switch 5, transparent electrodes 18 and 19 are disposed, forming a plurality of columns and rows which form a matrix between a pair of upper and lower sheets 16 and 17. These transparent electrodes 18 and 19 are spaced apart from each other by means of an electrically insulating spacer 20. The sheets 16 and 17 are also transparent. A position 21 at which the transparent electrodes 18 and 19 intersect each other individually corresponds to each of the subscriber display section 11 of the card C1 which is housed in the housing space 9 of the housing 1. Accordingly, while observing the name or other information in the subscriber display section 11 written on the obverse surface of the topmost card via a transparent sheet switch 5 after the card C is inserted into the housing space 9, a switch 21 corresponding to the subscriber display section 11 is selectively pressed, causing the sheet 16 to be flexed downwardly and deformed and causing the electrodes 18 and 19 to conduct. As a result, it is possible to select a specific subscriber whom it is desired to call.

Figure 10A:
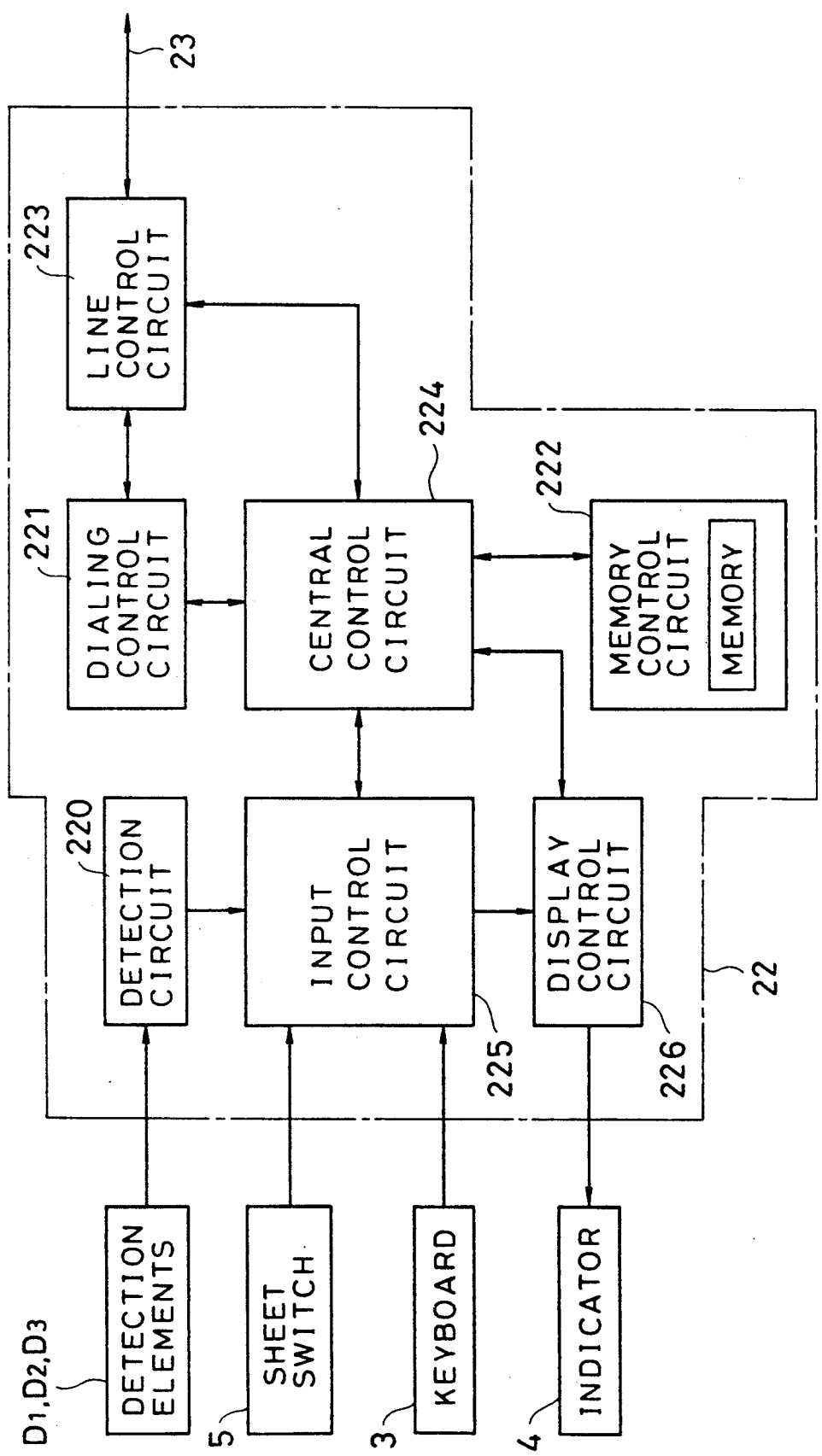
FIG. 10 (a) is a block diagram showing the electrical arrangement of an embodiment shown in FIGS. 1 to 9.
FIG. 10(b) is a schematic view for explaining the procedure for generating dial numbers in the embodiment.

FIG. 10(a) is a block diagram showing the electrical arrangement of the embodiment shown in FIGS. 1 to 9. The processing circuit 22 realized by a microcomputer in response to the output from the sheet switch 5, the detection elements D1, D2 and D3, and the key input means 3, performs a communication function over a telephone line 23 and causes a display means 4 to perform a visual display.

The arrangement of the processing circuit 22 will be explained hereinunder. Numeral 220 denotes a detection circuit which identifies a card according to the pattern of an output signal (See FIG. 8) from the detection elements D1, D2 and D3. Numeral 221 denotes a dialing control circuit which reads out dial information input from the keyboard 3 or stored in the memory of a memory control circuit 222 as the result of the input from the sheet switch 5 and which originates read-out dial information to a public telephone line 23 to cause a subscriber to be called. Numeral 223 denotes a line control circuit which performs a connection operation to the public telephone line 23 and the switching of lines between facsimiles and telephone sets. Numeral 224 denotes a central control circuit which collectively controls an input control circuit 225, a display control circuit 226, the dialing control circuit 221, the line control circuit 223, and the memory control circuit 222. The input control circuit 225 supplies various kinds of information and control instructions to the central control circuit 224 in correspondence to a card identification signal output from the detection circuit 220, a subscriber signal input from the sheet switch 5, and input information from the keyboard 3, respectively, in response to the output signals of the detection elements D1, D2 and D3. The input control circuit 225 includes a conversion table for specifying a memory address of the memory control circuit 222 according to a card identification signal output from the detection elements D1, D2 and D3 and a subscriber signal input from the sheet switch 5. The display control circuit 226 controls the display of information input from the keyboard 3 and the operating state of an apparatus by using an indicator 4.

Figure 10B:
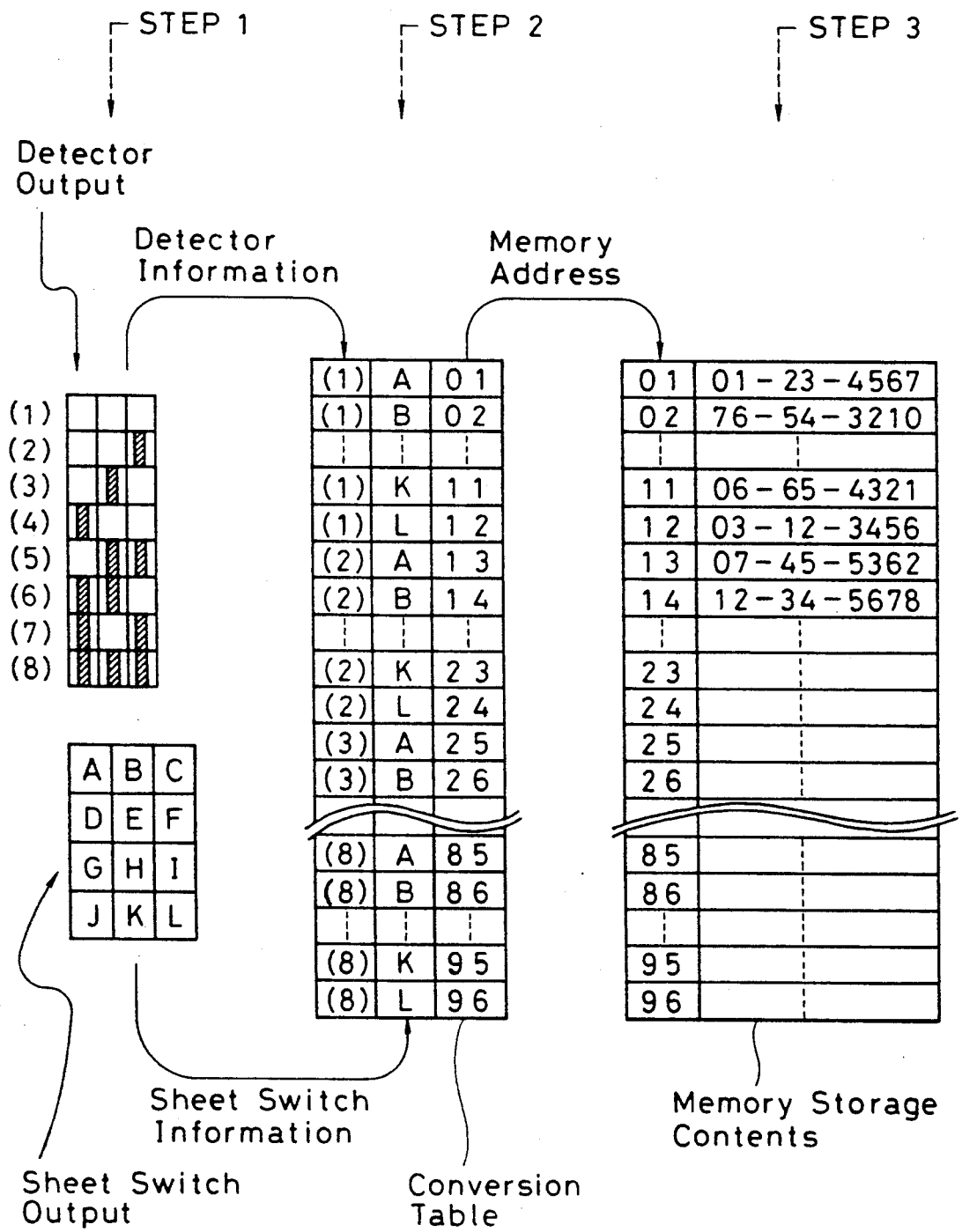

FIG. 10(b) illustrates the procedure for generating a dial number.

When three detection elements are used, regarding a card, a total of eight kinds of identifications are made possible, as shown in step 1 (the use of the reverse surfaces of cards enables identification of four cards, namely, eight surfaces). Regarding a sheet switch, if it is divided into A to L positions, the selection of a total of 12 different subscriber can be made. In the above-mentioned arrangement, accordingly, dial numbers of 96 kinds (=8 surfaces of cards×12 pieces in a sheet switch) can be specified.

Supposing that an output signal of the detection elements is (2) and the position "B" of the sheet switch 5 is pressed in step 1, the (2) and B of the conversion table are referred to by the input control circuit 225 in step S2 and the memory address 14 for generating a dial number is retrieved. The memory control circuit 222 outputs a dial number 12-34-5678 on the basis of the retrieved memory address 14 (see step 3). Thereafter, the dial number 12-34-5678 is sent out over the public telephone line 23 via the line control circuit 223 by means of the dialing control circuit 221, causing a subscriber to be called.

Figure 11:
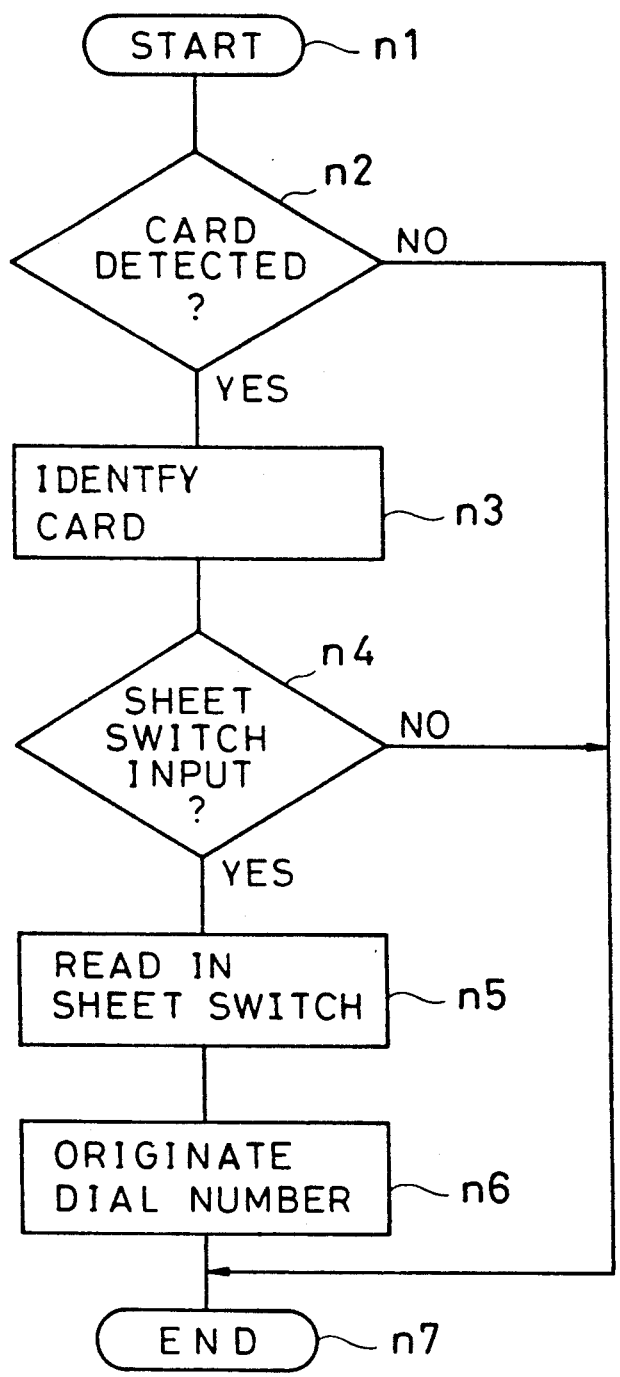
FIG. 11 is a flowchart for explaining the operation of a processing circuit 22.

FIG. 11 is a flowchart for explaining the operation of the processing circuit 22. In performing a facsimile transmission, three cards C1, C2 and C3 are inserted into the housing space 9 in a stacked state. As a result, when it is determined in step n2 that the identification section 10 on the obverse surface of the topmost card C1 is detected by the detection elements D1, D2 and D3, one surface of the card C1 is identified in step n3. In step n4, it is determined whether or not there occurred an input from the sheet switch 5. If the sheet switch 5 is operated, the subscriber display section 11 is detected and read in step n5. As a result, the processing circuit 22 reads out a dial number of a subscriber which has been previously stored in the memory of the memory control circuit 222 on the basis of the result of the identification by the identification section on the surface of the card C and the output of the switch 21 corresponding to the subscriber display section 11 selected by the sheet switch 5 and generates a signal representing a dial number over the public telephone line 23. Thus, a subscriber to be called on the other end of the line is called.

In the above-mentioned embodiment, the three cards C1, C2 and C3 are housed in the housing space 9 from the insertion slot 8 of the housing 1 in a stacked state. Therefore, any danger that the cards C1, C2 and C3 may be lost is eliminated. If the present invention were constructed in such a way that only one of the cards C1, C2 and C3 could be housed in the housing space 9, there would be some danger of losing the remaining cards which were not housed in the housing space 9. The present invention eliminates such a problem. Further, the detection elements D1, D2 and D3 may be arranged in such a way that, when only one or two cards are inserted out of the three cards C1, C2 and C3, detection by means of the detection elements D1, D2 and D3 cannot be possible.

FIG. 12 is a view illustrating cards in another embodiment of the present invention. As shown in FIG. 12(1), a subscriber display section 11a is formed on the left portion of one surface of a card C11. A identification section 10a which is a notch for identifying one surface of the card C11 is formed on the front end of the card in the insertion direction 7 and this identification section 10a is positioned away from the center line 13. Therefore, in the other surface of the card C11, the notches 10a are positioned on the right portion of one surface of the card C11 the center line 13, as shown in FIG. 12(2). This identification section 10a, which is a notch, can be detected by a optical detection element or a microswitch having an actuator. In addition, as shown in FIG. 12(3), an arrangement may be used in which a subscriber display section 11b is formed and a identification section 10b for identifying this card C12 is formed on one of the surfaces of a card C12.

The present invention can be used in conjunction with a facsimile apparatus and a telephone set. Further, the present invention can be used widely in conjunction with other devices for generating a dial number.

Accordingly to the present invention, it may be so arranged that one card C1, C2 C3, C11 or C12 housed in the housing space 9 so as to generate a dial number. Such a card is made of a material such as paper or synthetic resin and its construction is extremely simple, which is advantageous.

Many widely different embodiments of the present invention can be made without departing from the spirit and scope thereof, therefore, it is to be understood that this invention is not limited to the specific embodiments thereof except as defined in the appended claims.

What is claimed is:

1. A dial number generator comprising:
   a plurality of plate-like cards for selecting a specific subscriber to be called;
   a main body in which said cards are housed, for generating a dial signal of a specific subscriber to be called;
   said cards each having, on one side thereof, a subscriber display section in which a number of subscribers are symbolically displayed and a card identifying section for identifying the card;
   said main body including:
      a housing section for housing said cards with their subscriber display sections facing upward;
      a subscriber selecting section provided with a transparent window from which the subscriber display section of one of said cards housed in the housing section is viewed from above, which is further provided with switches on the window at positions corresponding to positions of respective subscribers displayed on the card, said subscriber selecting section outputting a subscriber call signal corresponding to each subscriber when the switch is operated via the window;
      a detecting section provided in the housing section for detecting any one of the card identifying sections of the cards and outputting a card signal corresponding thereto;
      a storage section for storing a subscriber dial number corresponding to a combination of a subscriber call signal and a card signal;

a dial number read-out section for reading out a subscriber dial number corresponding to a combination of a subscriber call signal and a card signal;

wherein said housing section is formed in a recessed place capable of housing a plurality of cards in a stacked state; and wherein said subscriber selecting section is made of a transparent electrode type touch panel.

2. A dial number generator as claimed in claim 1, wherein said card identifying section is provided with a striped pattern which is different from card to card.

3. A dial number generator as claimed in claim 1, wherein said card identifying section is formed with notches disposed on the peripheral edges of said card, the placement of the notches being different from card to card.

4. A dial number generator as claimed in one of claims 2 and 8, wherein said detecting section is composed of a light-emitting element and a light-receiving element in pairs.

5. A dial number generator as claimed in claim 3, wherein said detecting section is composed of a microswitch having an actuator.

6. A dial number generator comprising:

a main body having a planar matrix of transparent push-activated electrical switches affixed over a cavity sized to accept at least one removable card member of predetermined size disposed under said matrix of transparent push-activated switches;

a plurality of said removable card members, each card member including unique machine-readable identification indicia and also having a planar matrix of humanly-readable called-part indicia respectively aligned with the planar matrix of transparent push-activated electrical switches and visible therethrough;

said main body also including means for generating predetermined called-party telephone number signals in response to sensing (a) predetermined identification indicia and (b) activation of a predetermined one of said push-activated electrical switches;

wherein said cavity is sized to accept a stacked plurality of said card members, only the topmost one being actively usable at a given time to generate telephone number signals of called-parties thereon indicated.

7. A dial number generator as in claim 6 wherein each card member carries on each side thereof unique machine-readable identification indicia and a planar matrix of humanly-readable called-party indicia.

8. A dial number generator as in claim 6 wherein each of said card members is a substantially inflexible generally planar object.

* * * * *